United States Patent
Prasad et al.

(10) Patent No.: US 7,971,303 B2
(45) Date of Patent: Jul. 5, 2011

(54) SCRAPER TOOL FOR REMOVING MATERIAL FROM A SURFACE OF A METAL WORK PIECE

(75) Inventors: Hari Prasad, Troy, MI (US); Mark A. Schimming, Saline, MI (US); James F. Keys, Northville, MI (US); John Robert Ewolski, Brunswick, OH (US); Stephen A. Fetsko, Medina, OH (US)

(73) Assignee: Shiloh Industries, Inc., Valley City, OH (US)

( * ) Notice: Subject to any disclaimer, the term of this patent is extended or adjusted under 35 U.S.C. 154(b) by 834 days.

(21) Appl. No.: 11/975,508

(22) Filed: Oct. 19, 2007

(65) Prior Publication Data
US 2008/0092312 A1   Apr. 24, 2008

Related U.S. Application Data

(60) Provisional application No. 60/853,067, filed on Oct. 20, 2006.

(51) Int. Cl.
*B08B 1/02* (2006.01)
(52) U.S. Cl. .......................... 15/93.4; 29/81.11
(58) Field of Classification Search .............. 15/93.1, 15/93.4, 236.01, 236.05, 236.06, 236.09; 29/81.01, 81.03, 81.11; 30/169, 172, 299, 30/301, 304
See application file for complete search history.

(56) References Cited

U.S. PATENT DOCUMENTS

| | | | | |
|---|---|---|---|---|
| 1,143,465 A * | 6/1915 | Tuckett et al. | | 30/172 |
| 1,963,304 A * | 6/1934 | Kerr | | 29/81.11 |
| 2,024,993 A * | 12/1935 | Cole | | 72/40 |
| 2,453,371 A * | 11/1948 | Hobson | | 144/24.05 |
| 2,477,411 A * | 7/1949 | King | | 219/602 |
| 2,497,941 A * | 2/1950 | Hobson | | 144/24.05 |
| 2,590,966 A * | 4/1952 | Heller | | 30/172 |
| 2,637,057 A * | 5/1953 | Moore | | 15/93.4 |
| 2,802,496 A * | 8/1957 | Nicholson | | 144/208.6 |
| 2,961,742 A * | 11/1960 | Hatebur | | 29/81.11 |
| 3,750,760 A * | 8/1973 | Shockley | | 172/374 |
| 5,081,734 A * | 1/1992 | Sandford et al. | | 15/93.1 |
| 2006/0200932 A1 * | 9/2006 | Byrnes | | 15/236.06 |

* cited by examiner

*Primary Examiner* — Mark Spisich
(74) *Attorney, Agent, or Firm* — Reising Ethington P.C.; Michael C. Adams

(57) ABSTRACT

A scraper tool for removing material such as surface treatments, metal coatings, and other material layers from an edge region of a metal work piece where they could potentially contaminate a nearby weld. According to one embodiment, the scraper tool includes a body having a base portion and a tab portion, and several scraping elements attached to the base portion. During operation, the scraping elements scrape one or more surfaces of the edge region so that the depth to which the scraping element engage the metal work piece is generally affected by the amount of rotation of the scraper tool about a pivot axis.

18 Claims, 3 Drawing Sheets

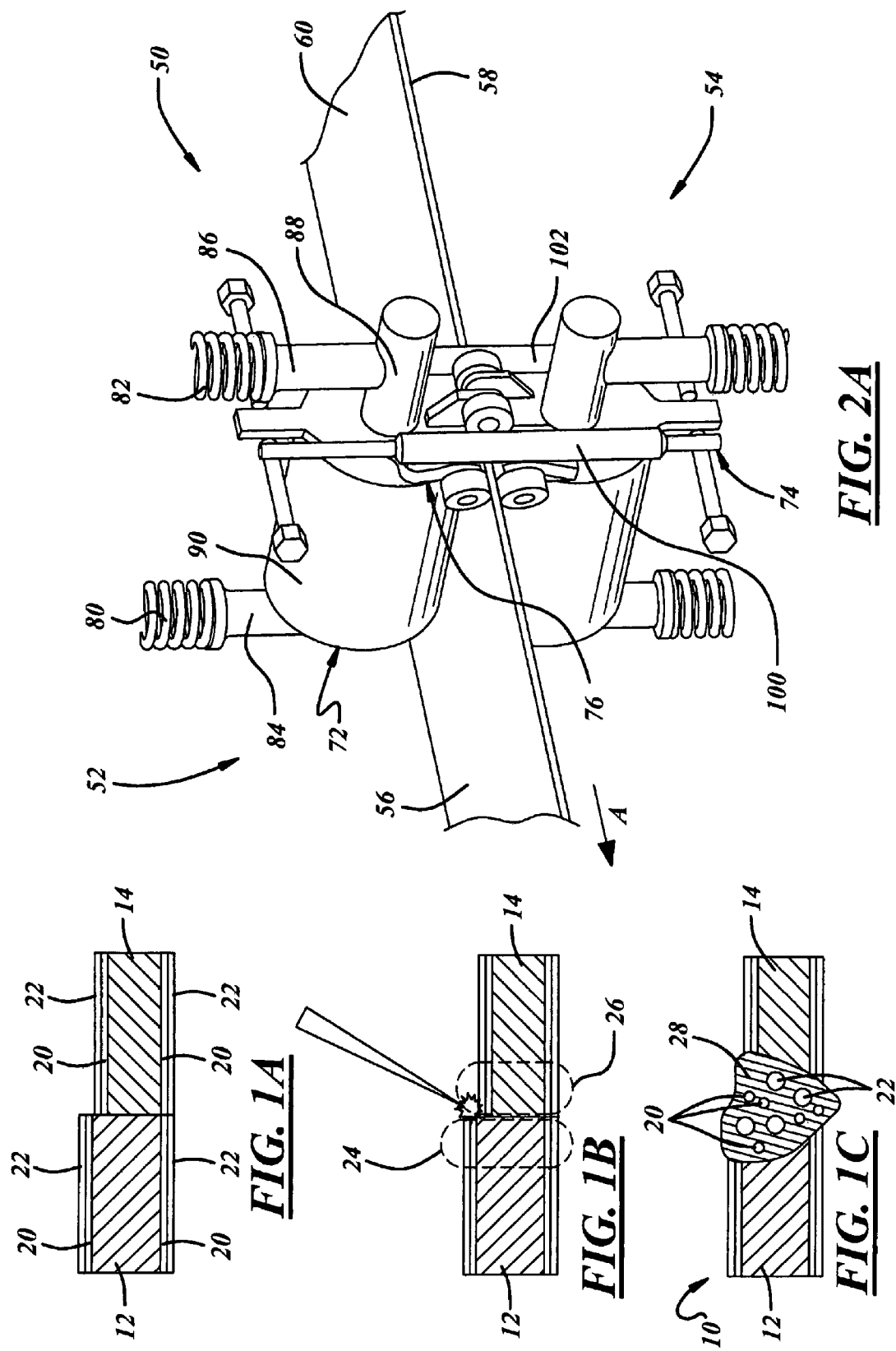

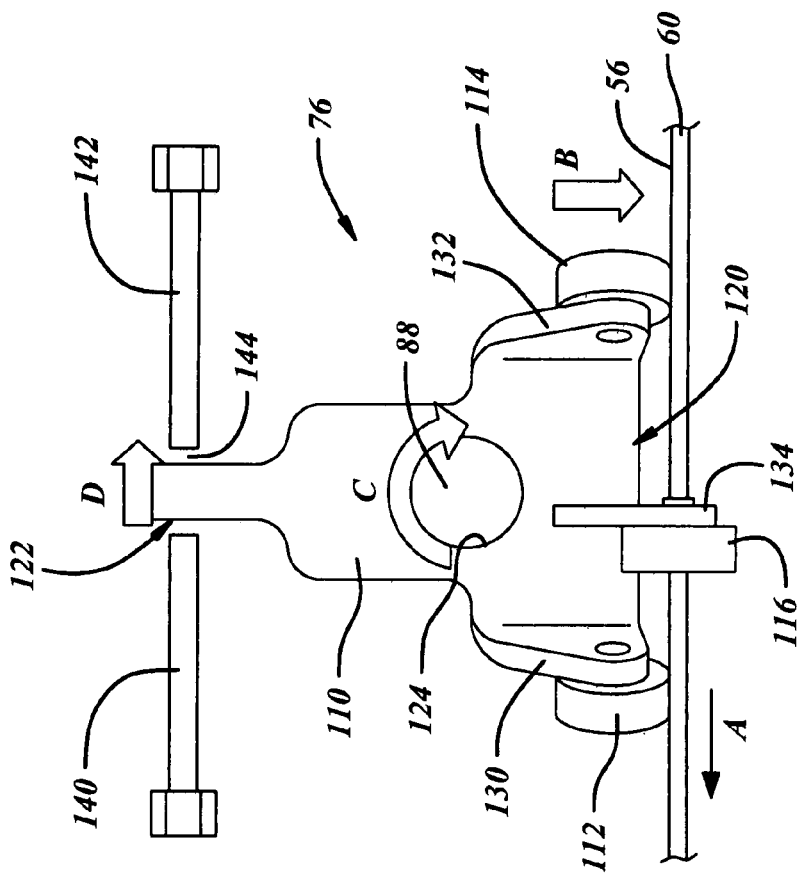
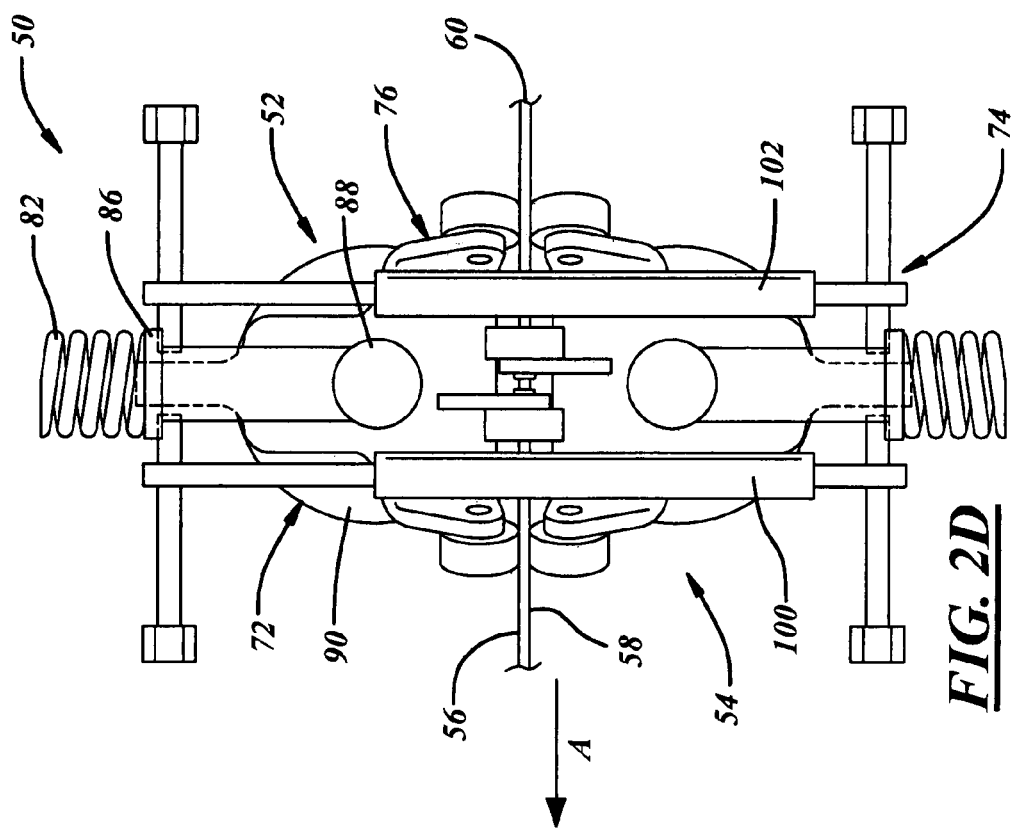
FIG. 3
FIG. 2D

US 7,971,303 B2

SCRAPER TOOL FOR REMOVING MATERIAL FROM A SURFACE OF A METAL WORK PIECE

REFERENCE TO RELATED APPLICATIONS

This application claims the benefit of U.S. Provisional Ser. No. 60/853,067 filed on Oct. 20, 2006, the entire contents of which are incorporated herein by reference.

FIELD OF INVENTION

The present invention generally relates to tools for removing material, and more particularly, to scraper tools that remove thin material layers from an edge region of a metal work piece.

BACKGROUND OF THE INVENTION

Sheet metal stock is sometimes intentionally provided from the steel mill with one or more thin materials layers that coat the sheet metal and protect it against, among other things, corrosion, oxidation and surface damage. In other instances, the sheet metal stock unintentionally picks up thin layers of contaminants during the manufacturing and material handling processes.

In some applications, the removal of these materials, whether they be added intentionally or unintentionally, could be helpful before processing the sheet metal stock.

SUMMARY OF THE INVENTION

According to one aspect, there is provided a scraper tool for removing material from a surface of a metal work piece. The scraper tool comprises a body having a base portion and a tab portion, and at least one scraping element attached to the base portion. Movement of the scraper tool is limited by the tab portion and affects the depth to which the scraping element engages the surface of the metal work piece.

According to another aspect, there is provided a scraper tool for removing material from a surface of a metal work piece. The scraper tool comprises a body having a base portion and an opening, and at least one scraping element attached to the base portion. Relative movement between the scraper tool and the metal work piece causes the scraper tool to rotate about a pivot axis and affects the depth to which the scraping element engages the surface of the metal work piece.

According to another aspect, there is provided a method for removing material from a surface of a metal work piece.

DESCRIPTION OF THE DRAWINGS

A preferred exemplary embodiment of the invention will hereinafter be described in conjunction with the appended drawings, wherein like designations denote like elements, and wherein:

FIGS. 1A-C are side views demonstrating the manufacture of a conventional tailor-welded blank that has not had thin material layers removed by the scraper tool described herein;

FIG. 2A is an isometric view of an exemplary embodiment of a scraper installation having upper and lower scraper assemblies and processing a long sheet metal piece;

FIG. 2D is a side view of the scraper installation shown in FIG. 2A; and

FIG. 3 is a side view of an exemplary embodiment of a scraper tool that can be utilized in the scraper installation shown in FIG. 2A.

DESCRIPTION OF A PREFERRED EMBODIMENT

Figure 2B:
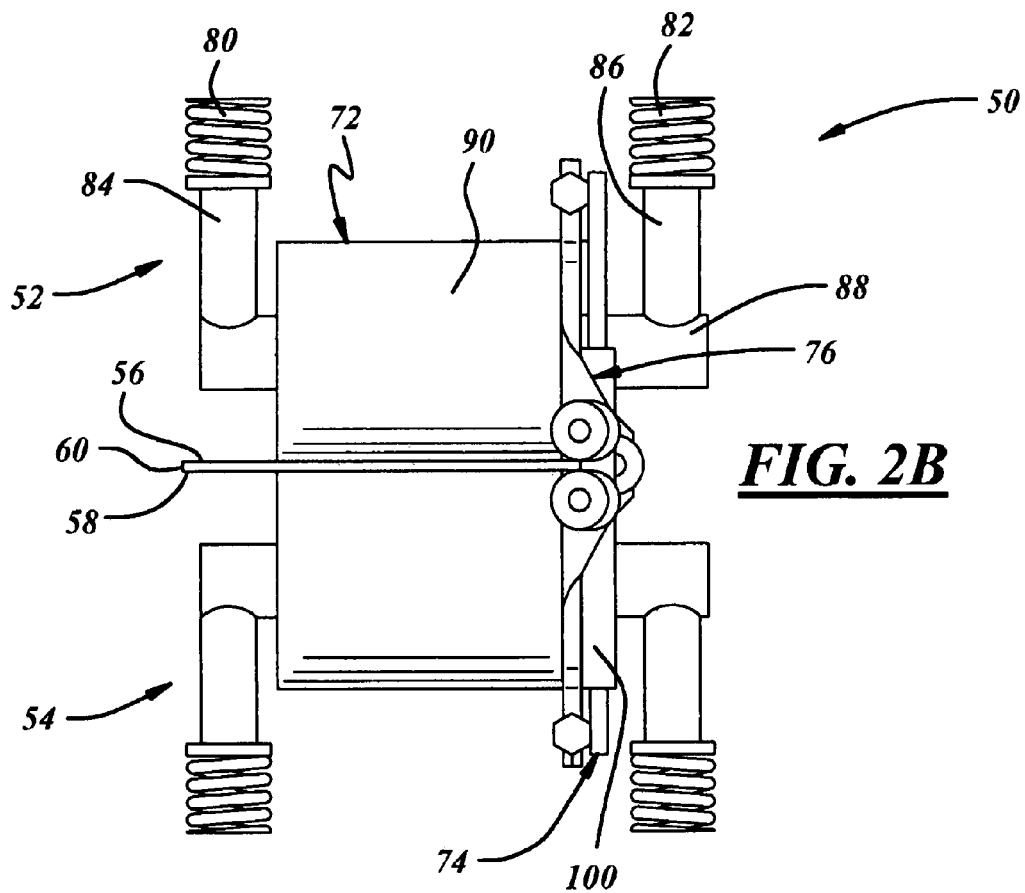
FIG. 2B is a front view of the scraper installation shown in FIG. 2A.

The scraper tool described herein can be used to scrape surfaces of an edge region of a sheet metal piece in order to remove surface treatments, metal coatings, or other thin material layers that could contaminate a weld in the edge region. Removing these substances prior to welding improves the quality of a weld in the edge region and increases the strength of items, such as tailor-welded blanks, that rely upon that weld for their structural integrity. Although a tailor-welded blank serves as a good example of an item that could benefit from the use of the scraper tool described herein, it should be appreciated that the scraper tool could be used with any metal work piece having surfaces where it is desirable to remove one or more thin material layers; not just ones involved with welding.

Turning first to FIGS. 1A-C, there are shown some of the steps involved with manufacturing a conventional tailor-welded blank 10 that includes thick and thin sheet metal pieces 12, 14 laser welded together in an edge-to-edge fashion. According to this example, each of the sheet metal pieces 12, 14 have several thin material layers 20, 22 covering upper and lower horizontal surfaces. As is appreciated by those skilled in the art, there are numerous material layers that could be found on sheet metal stock, including various types of surface treatments, metal coating layers such as Aluminum (Al) and Zinc (Zn), oils and other oxidation preventing substances, contaminants from the manufacturing or material handling processes, and oxidation layers, to name but a few. Once the two sheet metal pieces are brought together in abutment, a laser beam or other welding tool is used to melt some of the sheet metal located in edge regions 24, 26 so that a certain amount of the thin material layers 20, 22 becomes embedded within the resulting weld 28. Unless first removed, these unwanted constituents could have a negative impact on the overall strength and quality of the weld.

Figure 2C:
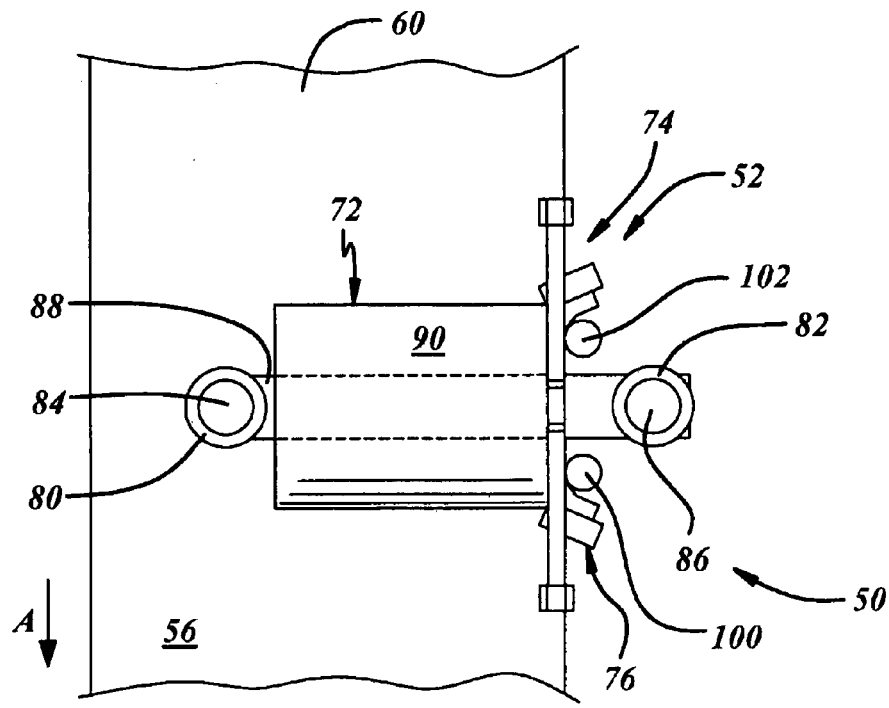
FIG. 2C is a top view of the scraper installation shown in FIG. 2A.

With reference to FIGS. 2A-D, there are shown various perspectives of an embodiment of a scraper installation 50 that includes upper and lower scraper assemblies 52, 54 that remove one or more thin material layers from upper and lower surfaces 56, 58, respectively, of an edge region of sheet metal piece 60. According to this particular embodiment, scraper installation 50 is set up to process a long sheet metal piece 60 being fed from a large roll or other sheet metal source (not shown), and is capable of being installed in one of a number of different settings. For example, scraper installation 50 could be set up as a stand-alone installation where the scraping operation is the only function being performed, it could be included as a stage of the actual sheet metal manufacturing process, or it could be set up as one of the pre-welding stages on a welding line, to name but a few of the possibilities. The following description is directed to upper scraper assembly 52, however, it should be appreciated that it applies equally to lower scraper assembly 54, as the two assemblies have many of the same parts.

Upper scraper assembly 52 is versatilely designed to process a wide variety of sheet metal sizes, and generally includes a height adjustment mechanism 72, an edge alignment mechanism 74, and a scraper tool 76. According to one embodiment, a housing having a number of blind holes, cavities, bores, cutouts and other features may be designed to operably receive the various components of upper scraper assembly 52. It should be appreciated that the housing may be a solid casing, a frame, a body, or any other structure designed to receive the parts of upper scraper assembly 52.

Height adjustment mechanism 72 enables scraper installation 50 to accommodate sheet metal pieces having varying thicknesses and maintains scraper tool 76 at an appropriate operational height. The height adjustment mechanism generally includes springs 80, 82, pistons 84, 86, shaft 88, and pressure roller 90, and is designed to interact with a corresponding height adjustment mechanism that is part of lower scraper assembly 54. Springs 80, 82 work in concert with pistons 84, 86 to exert a downwards, spring-biased force on shaft 88 so that pressure roller 90 is firmly pressed against the top surface 56 of sheet metal piece 60. Of course, other devices could be used in place of the springs and pistons, as they are simply one example of a mechanism capable of biasing pressure roller 90 towards upper surface 56. Shaft 88 is attached to the lower ends of pistons 84, 86 and is generally maintained in a horizontal fashion so that it can rotatably receive pressure roller 90. Shaft 88 also passes through scraper tool 76 and enables the scraper tool to rotate about its axis, as will be subsequently explained in more detail. Pressure roller 90 is preferably a cylindrical object made of a plastic or other semi-hard material and, when used in conjunction with the corresponding pressure roller of lower scraper assembly 54, exerts a compressive force on sheet metal piece 60. Skilled artisans will understand that the spacing between the pressure rollers can be adjusted in order to accommodate sheet metal pieces of differing thicknesses, but it should be recognized that the spring-biased nature of the pressure rollers allows for small changes in sheet metal thickness without having to actually make such an adjustment.

Edge alignment mechanism 74 helps maintain scraper tools of the upper and lower scraper assemblies 52, 54 in proper alignment with an edge of sheet metal piece 60, and generally includes a pair of vertical guides 100, 102. As their names suggest, vertical guides 100, 102 are vertically aligned members that are secured at their upper and lower ends, and are designed to engage the edge of sheet metal piece 60. Put differently, the vertical guides 100, 102 position the upper and lower scraper tools such that they respectively engage upper and lower surfaces of an edge region of sheet metal piece 60, thereby ensuring that the edge region is properly scraped free of surface material layers. Although the vertical guides in this embodiment include cylindrical rollers rotatably mounted on solid shafts, other arrangements including bearings, low-friction coatings, or non-rotatable guide components could be used to facilitate relative movement with the sheet metal edge.

Scraper tool 76 can scrape the surface of a sheet metal piece in both forward and backward directions of sheet metal travel, and can do so at a controllable depth. With specific reference to FIG. 3, scraper tool 76 generally includes a rigid body 110 and scraping elements 112-116. Rigid body 110 is preferably made from a generally flat piece of metal which, according to the embodiment shown here, has been formed with a wide base portion 120, a narrow tab or ear portion 122, and a circular opening 124. Wide base portion 120 is usually adjacent the sheet metal piece and includes three bent mounting tabs 130-134 that receive scraping elements 112-116, respectively. The three scraping elements shown here are replaceable, non-rotating, circular cutting elements, however, it should be noted that rotating, oval, triangular, square, and other shapes could be used just as easily. As will be subsequently explained, scraping elements 112, 114 are each designed to scrape a thin strip along the upper horizontal surface 56 of sheet metal piece 60 (a strip adjacent the edge of the sheet metal), while scraping element 116, which is an optional component, scrapes the vertical edge itself.

Tab portion 122 helps control the depth at which scraping elements 112, 114 dig into upper sheet metal surface 56 by constraining the pivotal movement of body 110 about shaft 88. As sheet metal piece 60 moves in a direction A, scraper tool 76 (which is being pressed against the sheet metal piece in a direction B) pivots about shaft 88 in a clockwise direction C so that scraping element 114 digs into the upper surface 56 of the sheet metal piece. This clockwise rotation causes tab portion 122 to move in a direction D until it strikes an axial end of depth adjuster 142, which prevents the scraping tool from rotating any further. Accordingly, the size of space 144, which extends between the ends of depth adjusters 140, 142 and is an adjustable dimension, helps dictate the depth of the scraping operation. It should, of course, be appreciated that one of a number of different components could be used in place of depth adjusters 140, 142 in order to limit movement of tab portion 122 and hence rotation of scraper tool 76.

In operation, upper and lower scraping tools remove thin material layers from upper and lower surfaces of a sheet metal piece in a region referred to as the 'edge region'. The edge region broadly includes all sections of a metal work piece, whether they be flat, contoured, horizontal, vertical, etc., that are proximate a work piece edge. First, all desired adjustments to scraper installation 50 should be made, such as altering the spacing between upper and lower scraper assemblies 52, 54, or adjusting the scraping depth by threadably adjusting depth adjusters 140, 142.

Next, sheet metal piece 60 is fed into scraper installation 50 in a direction A so that its thickness is compressed between upper and lower pressure rollers and its edge engages vertical guides 100, 102. Further movement by the sheet metal piece in the direction A causes scraper tool 76 to pivot about shaft 88 in a clockwise direction C (see FIG. 3). This pivotal movement continues until tab portion 122 contacts the axial end of depth adjuster 142, at which point the scraper tool is prohibited from further rotation. It should be appreciated that in some embodiments rotation of the scraper tool could be limited by the interaction between scraping elements 112, 114 and the work piece and not by the contact between tab portion 122 and components 140, 142. The degree of pivotal movement experienced by scraper tool 76 generally dictates the depth to which scraping element 114 can dig into the upper sheet metal surface 56. Scraping element 116 also engages a surface of the edge region; namely, the vertical edge itself.

Accordingly, scraper tool 76 is capable of: scraping multiple surfaces of an edge region in a single pass (upper horizontal surface 56 and the vertical edge surface), controlling the depth of the scrape, collecting removed material for disposal, and accommodating varying sheet metal thicknesses, to name but a few attributes. If both the upper and lower scraper assemblies 52, 54 are used together, then a lower scraping tool removes material from a surface that is located on lower surface 58 of the sheet metal piece and is also part of the edge region. Thus, top, bottom and edge surfaces are all scraped at the same time. With reference back to FIGS. 1A-C, this process scrapes away those portions of layers 20, 22 that are located within edge regions 24, 26 so that weld 28 is not contaminated with particles from surface layers 20, 22.

It is worth noting, when sheet metal piece 60 is moving in a direction A relative to scraping tool 76, scraping element 114 is pivoted downwards so that it engages upper surface 56 and scraping element 112 is pivoted upwards so that it does not contact upper surface 56; thus, only one of the two scraping elements 112, 114 scrapes the surface of sheet metal piece 60 at a time. Conversely, if sheet metal piece were to move in a direction opposite A, then scraping element 112 would contact upper surface 56 and scraping element 114 would be pivoted into a non-contact position.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the disclosed scraping tool 76 could be used to process sheet metal blanks instead of the more continuous sheet metal roll 60 described above, scraper installation 50 could include either an upper or a lower scraper assembly 52, 54 instead of both, and one or more scraping elements 112-116 could be removed or added to scraper tool 76, to name but a few of the possibilities. All such other embodiments, changes, and modifications are intended to come within the scope of the appended claims.

As used in this specification and claims, the terms "for example", "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. In a scraper installation for removing material from a sheet metal piece moving through the installation, a scraper assembly being provided to engage at least one surface in an edge region of the moving sheet metal piece, the scraper assembly comprising:
    a depth adjuster; and
    a scraper tool comprising:
        a body having a base portion pivoted about a shaft;
        a tab portion at a first end of the base portion and located adjacent the depth adjuster for contact with the depth adjuster during use; and
        a scraping element at a second end of the base portion, the scraping element being located on the same leading or trailing side of the shaft as the depth adjuster, with respect to the direction of the moving sheet metal piece;
    wherein movement of the scraper tool about the shaft is limited by the tab portion contacting the depth adjuster and affects the depth to which the scraping element engages the surface of the moving sheet metal piece.

2. The scraper assembly of claim 1, wherein a first scraping element is attached near a first side of the base portion and a second scraping element is attached near a second side of the base portion, the first and second scraping elements are positioned to engage an upper surface of the edge region of the sheet metal piece.

3. The scraper assembly of claim 2, wherein only the first of the two scraping elements engages the upper surface when the scraper tool is rotated in a first direction, and only the second of the two scraping elements engages the upper surface when the scraper tool is rotated in a second direction.

4. The scraper assembly of claim 2, further comprising a third scraping element that is attached to the base portion between the first and second sides and is positioned to engage an edge surface of the edge region of the sheet metal work piece.

5. The scraper assembly of claim 1, wherein the scraping element is a generally circular, non-rotating scraping element.

6. The scraper assembly of claim 1, further comprising an opening in the body for receiving the shaft, wherein relative movement between the scraper tool and the sheet metal piece causes the scraper tool to rotate about the shaft until the tab portion contacts the depth adjuster.

7. The scraper assembly of claim 1, further comprising a height adjustment mechanism for maintaining the scraper tool in an engaged position against the sheet metal piece.

8. The scraper installation of claim 1, further comprising a second scraper assembly being located on an opposite side of the moving sheet metal piece as the first scraper assembly and being provided to engage at least another surface in the edge region of the moving sheet metal piece.

9. In a scraper installation for removing material from a sheet metal piece moving through the installation, a scraper assembly being provided to engage at least one surface in an edge region of the moving sheet metal piece, the scraper assembly comprising:
    a scraper tool comprising:
        a body having a base portion and an opening, the opening receives
        a shaft that can act as a pivot axis; and
            at least one scraping element being attached to the base portion and being located at a leading side of the pivot axis, with respect to the direction of the moving sheet metal piece,
    wherein relative movement between the scraping element and the moving sheet metal piece causes: i) the scraper tool to rotate about the pivot axis, ii) the scraping element to dig into the surface of the moving sheet metal piece at the leading side of the pivot axis, and iii) the scraping element to remove material from the surface of the moving sheet metal piece.

10. The scraper assembly of claim 9, wherein a first scraping element is attached near a first side of the base portion and a second scraping element is attached near a second side of the base portion, the first and second scraping elements are positioned to engage an upper surface of the edge region of the sheet metal piece.

11. The scraper assembly of claim 10, wherein only the first of the two scraping elements engages the upper surface when the scraper tool is rotated in a first direction, and only the second of the two scraping elements engages the upper surface when the scraper tool is rotated in a second direction.

12. The scraper assembly of claim 10, further comprising a third scraping element that is attached to the base portion between the first and second sides and is positioned to engage an edge surface of the edge region of the sheet metal piece.

13. The scraper assembly of claim 9, further comprising a tab portion extending from the base portion in order to contact a component that can limit rotation of the scraper tool.

14. The scraper assembly of claim 9, wherein the at least one scraping element is a generally circular, non-rotating scraping element.

15. The scraper assembly of claim 9, further comprising one or more components for limiting rotation of the scraper tool, and a height adjustment mechanism for maintaining the scraper tool in an engaged position against the sheet metal piece.

16. The scraper installation of claim 9, further comprising a second scraper assembly being located on an opposite side of the moving sheet metal piece as the first scraper assembly and being provided to engage at least another surface in the edge region of the moving sheet metal piece.

17. In a scraper installation for removing material from a sheet metal piece moving through the installation, a scraper assembly being provided to engage at least one surface in an edge region of the moving sheet metal piece, the scraper assembly comprising:
  a scraper tool comprising:
    a body having a base portion;
    a first scraping element being attached to the base portion and scraping an upper surface or a lower surface of the moving sheet metal piece; and
    a second scraping element being attached to the base portion and scraping an edge surface of the moving sheet metal piece, wherein the upper or lower surface and the edge surface are in the edge region of the moving sheet metal piece, and the scraper tool simultaneously removes material from the upper or lower surface and the edge surface as the sheet metal piece moves through the installation.

18. The scraper installation of claim 17, further comprising a second scraper assembly being located on an opposite side of the moving sheet metal piece as the first scraper assembly and being provided to engage at least another surface in the edge region of the moving sheet metal piece.

* * * * *

UNITED STATES PATENT AND TRADEMARK OFFICE
CERTIFICATE OF CORRECTION

| | | |
|---|---|---|
| PATENT NO. | : 7,971,303 B2 | Page 1 of 1 |
| APPLICATION NO. | : 11/975508 | |
| DATED | : July 5, 2011 | |
| INVENTOR(S) | : Hari Prasad et al. | |

It is certified that error appears in the above-identified patent and that said Letters Patent is hereby corrected as shown below:

Column 6, claim 4, line 4, after "metal", delete "work"

Signed and Sealed this
Fifteenth Day of November, 2011

David J. Kappos
*Director of the United States Patent and Trademark Office*